July 28, 1964  F. D. McVEY  3,142,317
TWO-STAGE HOT GAS VALVE
Filed Dec. 21, 1959

INVENTOR.
FRANCIS D. McVEY
BY
ATTORNEY

United States Patent Office 3,142,317
Patented July 28, 1964

3,142,317
TWO-STAGE HOT GAS VALVE
Francis D. McVey, Washington, D.C., assignor, by mesne assignments, to PneumoDynamics Corporation, Cleveland, Ohio, a corporation of Delaware
Filed Dec. 21, 1959, Ser. No. 860,956
4 Claims. (Cl. 137—628)

This invention relates generally to valve mechanisms and more particularly to a valve suitable for use with extremely high temperature gases.

In the field of rocketry, it is often necessary to valve the gas flow from the rocket engine in order to operate the stabilization and guidance nozzles of the rocket. Extreme difficulty has been encountered in such installations since the gases from the rockets often reach temperatures in the order of 7,000° F. It has been found that two important factors combine to cause valve failure in high temperature installations: the first, of course, is the temperature and the second is the velocity of flow. As the valve approaches the closed position, sonic flow occurs. This produces high heat transfer rates and results in rapid erosion of the valve elements. Even the use of high temperature materials does not prevent the erosion which makes most valve mechanisms unsuitable for such installations.

In a valve according to this invention, the shut off valve element is not operated until the flow has been substantially choked off by an upstage throttling device so that the valve element is not subjected to high flows of high temperature gases during its operation. The throttling device, on the other hand, does not provide sealing so a substantial amount of erosion can take place before the device will fail to function.

It is an important object of this invention to provide a hot gas valve capable of operating in extremely high temperatures.

It is another important object of this invention to provide a hot gas valve including throttling means upstream from the valve element which functions to choke the gas flow before the valve element is closed.

It is another important object of this invention to provide a pressure operated valve mechanism including a choke element which reduces the flow prior to the operation of the valving element.

It is another object of this invention to provide a hot gas valve including a choking element designed to function properly even under erosive conditions in combination with a shutoff valve element which is protected from erosion by the choking element.

It is still another object of this invention to provide a hot gas valve suitable for use in the control of combustion products of rocket motors and the like.

It is still another object of this invention to provide a hot gas valve capable of controlling the flow of gases in the order of 7,000° F.

Further objects and advantages will appear from the following description and drawings, wherein.

Figure 1:
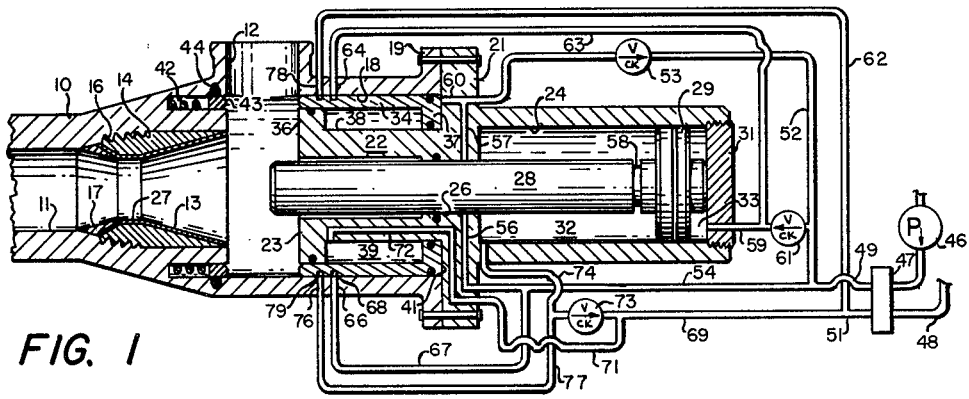
FIGURE 1 is a side elevation in longitudinal section showing a preferred form of valve structure incorporating this invention in the open position illustrating the control piping necessary for the operation of the valve.

The illustrated embodiment of this invention is suitable for use in connection with the valving of hot gases in an installation where the flow is choked at some downstream restriction so that sonic flows do not occur through the valve when the valve is open. If a simple valve operation were used, a critical condition would occur during the closing and opening sequence where the flow area would be smaller than the downstream restriction. In such a critical condition, sonic flow would occur within the valve itself. The heat transfer and erosion rates which will occur during sonic flow at high temperatures are extremely high and a conventional seat or plunger type valve could not withstand the severe rate of erosion and still remain operable for subsequent valving cycles.

In the disclosed valve, a choking or modulating device is provided to substantially reduce the flow before the valve element is operated to provide the positive shutoff. This choking device is constructed and arranged so that it functions even after it has eroded a substantial amount. In effect, the choking device localizes the erosion to an area which will not prevent proper operation of the valve and as a result, protects the positive valving element, thus greatly increasing the life of the valve.

Referring to the drawings, the valve is provided with a housing 10 formed with an inlet 11 and an outlet 12. The inlet would be connected by suitable piping to the source of gas under pressure such as a rocket motor and the outlet connected to the device to be controlled by the valve. It is contemplated that this valve is suitable for use in the control of the stabilization and direction nozzles of a rocket in such a manner that the downstream system connected to the outlet 12 provides sufficient flow restriction to prevent the occurrence of sonic flow within the valve housing 10 when the valve is open.

Located within the inlet 11 is a throat provided with a tungsten sleeve 13 which could be flame sprayed on a carbon liner 14. The carbon liner is formed with coarse threads 16 which are used to fasten the liner 14 in the housing 10. A cone 17 of a nylon asbestos compound is located to form the forward throat section to provide additional heat resistant qualities in this area.

The housing 10 is formed with a bore 18 coaxial with the inlet 11 and a flange 19. A cylinder member 21 is bolted to the flange 19 and is formed with a central projection 22 which extends into the bore 18 and terminates at a forward wall 23 flush with the outlet 12. The cylinder member 21 is also provided with a cylinder bore 24 and a central plunger passage 26 which is coaxial with a throat 27 defined by the tungsten sleeve 13. A plunger 28 having a piston head 29, both of which may be formed of carbon which can be coated with tungsten or a tungsten-zirconia surface, is axially movable in the plunger passage 26 from a retracted position as shown in FIGURE 1 to a forward position of FIGURES 2 and 3 at which time the plunger 28 projects into and substantially closes the throat 27. The cylinder bore 24 is closed at the rearward end by a cylinder head 31. The piston head 29 divides the cylinder bore 24 into a forward chamber 32 and a rearward chamber 33 so that fluid under pressure can be admitted under either side of the piston head 29 to actuate the plunger 28. If fluid is admitted into the forward chamber 32, the plunger 28 is moved to the retracted or rearward position of FIGURE 1. Conversely, if fluid under pressure is admitted to the rearward chamber 33, the plunger 28 is moved into the throat 27 as shown in FIGURES 2 and 3.

Figure 2:
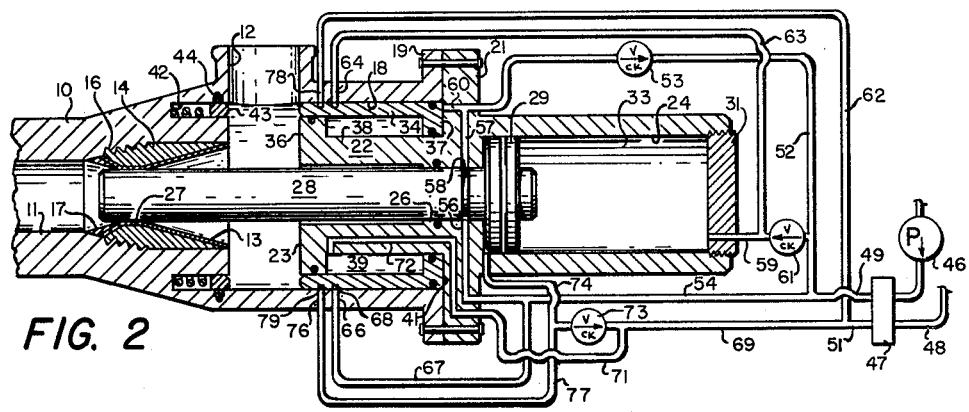
FIGURE 2 is a view similar to FIGURE 1 illustrating the positions of the elements during the intermediate or choking step before the valve element is closed.
Figure 3:
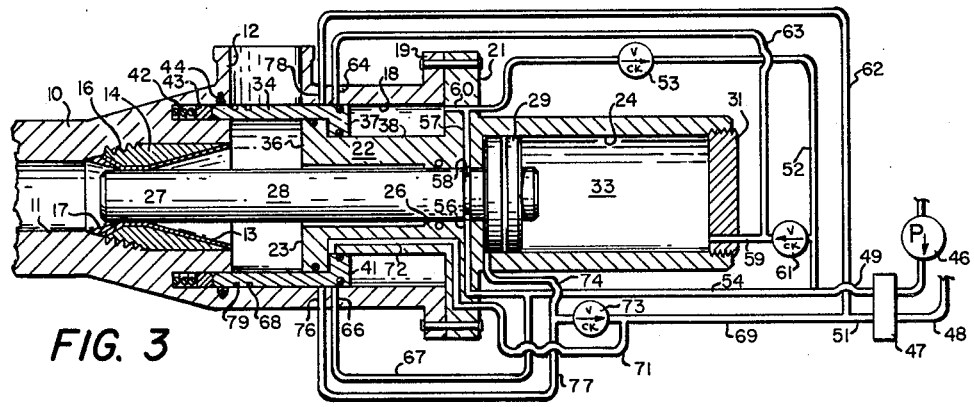
FIGURE 3 is a view similar to FIGURES 1 and 2 showing the valve elements in the closed position.

A cylindrical valve element 34 is positioned within the bore 18 and is slideable from a retracted or open position of FIGURES 1 and 2 to a forward or closed position of FIGURE 3. The valve element 34 is formed with an inwardly extending annular piston head 37 which engages a cylindrical surface 38 on the central projection 22 and divides the valve element actuating cavity into a forward chamber 39 and a rearward chamber 41. The valve element 34 is preferably formed of a steel cylinder coated with a phenolic material to provide heat resistance. When the rearward chamber 41 is pressurized, the valve element 34 is moved across the outlet 12 to prevent gas flow as shown in FIGURE 3. When closed, the valve element 34 projects into an annular groove 42 in the housing 10 and engages a seal protecting ring or shield 43 which is spring loaded into a position covering a seal 44. Movement of the valve element 34 to the closed position pushes the shield 43 back into the groove 42 so that the seal 44 engages the outer surface of the valve element 34.

The sequence of valve operation is shown by comparing FIGURES 1, 2, and 3. When the valve is in the open position of FIGURE 1, the plunger 28 is spaced away from the throat 27 and the valve element 34 is in its retracted position. At this time, the inlet 11 and outlet 12 are connected and unrestricted flow is provided. When the valve is to be closed, the plunger 28 is moved into the throat 27 as shown in FIGURE 2 while the valve element 34 remains in the retracted or open position. As soon as the plunger 28 enters the throat 27, the flow is choked off to a very low rate and the valve element 34 is then moved forward to completely block off the flow. The plunger 28 is formed with a relatively loose fit with the throat 27 so that sticking or jamming will not take place. The sonic flow which occurs during the choking off process does cause some erosion of the plunger 28 but since the plunger 28 does not have to provide absolute sealing, this erosion does not hinder the operation of the valve.

During the opening cycle of the valve, the valve element 34 is withdrawn while the plunger 28 remains in the throat 27. After the valve element 34 is in the open position, the plunger 28 is removed from the throat 27 to permit unrestricted flow through the inlet passage 11 and the outlet passage 12 of the valve.

To operate the valve element 34 and the plunger 28, a fluid pressure control system is provided which automatically sequences the operation of the plunger 28 and the valve element 34. The fluid under pressure may be either gas or hydraulic depending on the design requirements of the particular installation. In the illustrated embodiment, a pneumatic system is utilized which includes a pump 46 and an exhaust line 48 both of which are connected to a four-way control valve 47. In the event that a hydraulic system were used, the inlet of the pump 46 and the exhaust line 48 would be connected to a reservoir. Two control lines 49 and 51 running from the valve 47 can be selectively connected to either the pump 46 or the exhaust 48.

The control line 49 is connected to the rearward chamber 41 through a pressure line 52 and a check valve 53. The control line 49 is also connected through a pressure line 54 to a radial passage 56 open to the central plunger passage 26. A radial passage 57 formed in the cylinder 21 is in communication with the radial passage 56 through an annular groove 58 on the plunger 26 only when the plunger 26 is in the forward position. The passage 57 connects to the rearward chamber 41 through a passage 60 so the annular groove 58 functions as a valve to bypass the check valve 53 when the plunger 28 is in the forward or choked position.

The control line 49 is also connected to the rearward chamber 33 through a pressure line 59 and a check valve 61. The pressure line 59 on the side of the check valve 61 remote from the control line 49 is connected through passage 63 to a radial port 64 open to the bore 18. The radial port 64 is aligned with a co-operating port 66 and is connected in turn to the pressure line 54 through a passage 67. When the valve element 34 is in the open position, an annular groove 68 formed in its periphery provides flow connected between the two radial ports 64 and 66 and in effect bypasses the check valve 61.

The control line 51 is connected to the forward chamber 39 through passages 69, 71, and 72. The control line 51 is also connected to the forward chamber 32 through a check valve 73 and a passage 74. The downstream side of the check valve 73 is connected to a radial port 76 through a passage 77. A co-operating radial passage 78 opens to the bore 18 opposite the radial passage 76 and is connected thereto by an annular groove 79 when the valve element 34 is in the retracted or open position. The radial port 78 is connected to the control passage 51 and in effect bypasses the check valve 73 when the valve element 34 is in the open position.

In operation, when the valve is in the open position of FIGURE 1 and the four-way valve 47 is operated to pressurize the control line 49, fluid under pressure is admitted through the check valve 61 and the line 59 to the rearward chamber 33. Since the plunger 28 is in the retracted position at this point, flow cannot pass through the two passages 56 and 57. The check valve 53 also prevents flow from the pump 46 to the rearward chamber 41. Because the rearward chamber 41 is not pressurized, the valve element 34 remains open. However, the pressure fluid within the rearward chamber 33 operates against the piston head 29 to move the plunger 28 to the forward position into the throat 27 as shown in FIGURE 2. As soon as the plunger 28 is in the forward position of FIGURE 2, the two radial passages 56 and 57 are connected by the annular groove 58 and the check valve 53 is bypassed. Therefore, fluid under pressure is supplied to the rearward chamber 41 and the valve element 34 is moved to the closed position of FIGURE 3.

It should be noted that the valve element 34 cannot be moved forward to the closed position until after the plunger 28 is in the fully extended position at which time it chokes off the flow through the throat 27. When the valve is to be opened, the four-way valve 47 is operated to pressurize the control passage 51. When this occurs, pressure fluid is admitted through the passages 69, 71, and 72 to the forward chamber 39. This operates to move the valve element 34 to the opened position of FIGURE 2. The fluid under pressure within the rearward chamber 33 is trapped because it cannot escape through the check valve 61 or the radial ports 64 and 66 until the valve element 34 reaches the retracted position so the plunger 28 remains in the forward position. The forward chamber 32 is also isolated from the control line 51 by the check valve 73 until the valve element 34 reaches its fully open position of FIGURE 2.

As soon as the valve element reaches the retracted position of FIGURE 2, the two annular grooves 68 and 79 connect the associated radial ports. Fluid under pressure is therefore admitted to the forward chamber 32 and the rearward chamber 33 is vented. This operates to retract the plunger 28 to the fully open position of FIGURE 1. Here again, the control system is automatically sequenced so that the plunger 28 cannot be withdrawn until after the valve element 34 is fully opened.

Those skilled in the art will recognize that the use of a two-stage valving operation of the type disclosed results in a structure which can withstand extremely high temperatures and relatively high pressures. The plunger 28 is constructed so that it can withstand considerable erosion while still performing its function of choking the flow through the throat 27 and the valve element 34 only operates when the flow is substantially choked off by the plunger 28. The valve element 34 is therefore protected against operation which would produce sonic flow and cause erosion of the valving element 34.

Although various structural materials have been indicated as preferred for the construction of a valve incorporating this invention, it should be realized that other materials could be used. The portions of the valve which are exposed to the hot gases at non-sonic flows will preferably be formed of a phenolic resin which has good insulating properties and which is able to withstand high temperatures for appreciable lengths of time.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A valve comprising
   a body having a flow passage therethrough,
   said flow passage having a throat,
   a plunger movably supported by said body for movement between a first position spaced from the throat of the passage which enables substantially unrestricted flow therethrough to a second position whereat said plunger is disposed within the throat of said passage and effective to reduce flow therethrough,
   a valve element movably supported by said body for movement between a first position which enables relatively unrestricted flow through the passage to a second position whereat said valve element restricts flow therethrough, and
   a control system for sequentially urging the plunger and the valve element to move between the respective first and second positions thereof,
   said system comprising
   fluid pressure responsive operating means cooperable with a source of fluid under pressure for moving the plunger and the valve element between the said positions,
   said plunger and said body having passage means communicable with said fluid pressure source when said plunger is disposed in the second position to enable movement of the valve element from the first position to the second position thereof.

2. A valve comprising
   a body having inlet and outlet flow passages therethrough,
   said inlet flow passage having a throat therein,
   a plunger movably supported by said body for movement between a first position spaced from the throat of the inlet passage which enables substantially unrestricted flow therethrough to a second position whereat said plunger is disposed within the throat of said inlet passage and effective to reduce flow therethrough,
   a valve element movably supported by said body for movement between a first position which enables relatively unrestricted flow through the inlet and the outlet passages to a second position whereat said valve element restricts flow therethrough, and
   a control system for sequentially urging the plunger and the valve element to move between the respective first and second positions thereof,
   said system comprising fluid pressure responsive operating means cooperable with a source of fluid under pressure for moving the plunger and the valve element between the said positions,
   said plunger and said body having positions thereof defining a passage communicable with said fluid pressure source when said plunger is disposed in the second position to enable movement of the valve element from the first position to the second position thereof.

3. The valve as set forth in claim 2 wherein
   said body is provided with a seal for engaging the valve element when the valve element is in the second position, and
   a shield normally covering said seal and operably disposed to be moveable therefrom when the valve element is urged from the first to the second position.

4. The valve as set forth in claim 2 wherein
   said throat is formed of heat-resistant material, and
   said plunger is formed of erosion-resistant material.

References Cited in the file of this patent

UNITED STATES PATENTS

| | | |
|---|---|---|
| 2,614,795 | Allen | Oct. 21, 1952 |
| 2,694,413 | Force | Nov. 16, 1954 |
| 2,717,004 | Page | Sept. 6, 1955 |
| 2,829,670 | Nix | Apr. 8, 1958 |
| 2,830,620 | Shuptrine | Apr. 15, 1958 |

FOREIGN PATENTS

| | | |
|---|---|---|
| 696,605 | France | of 1930 |